United States Patent Office 3,312,893
Patented Apr. 4, 1967

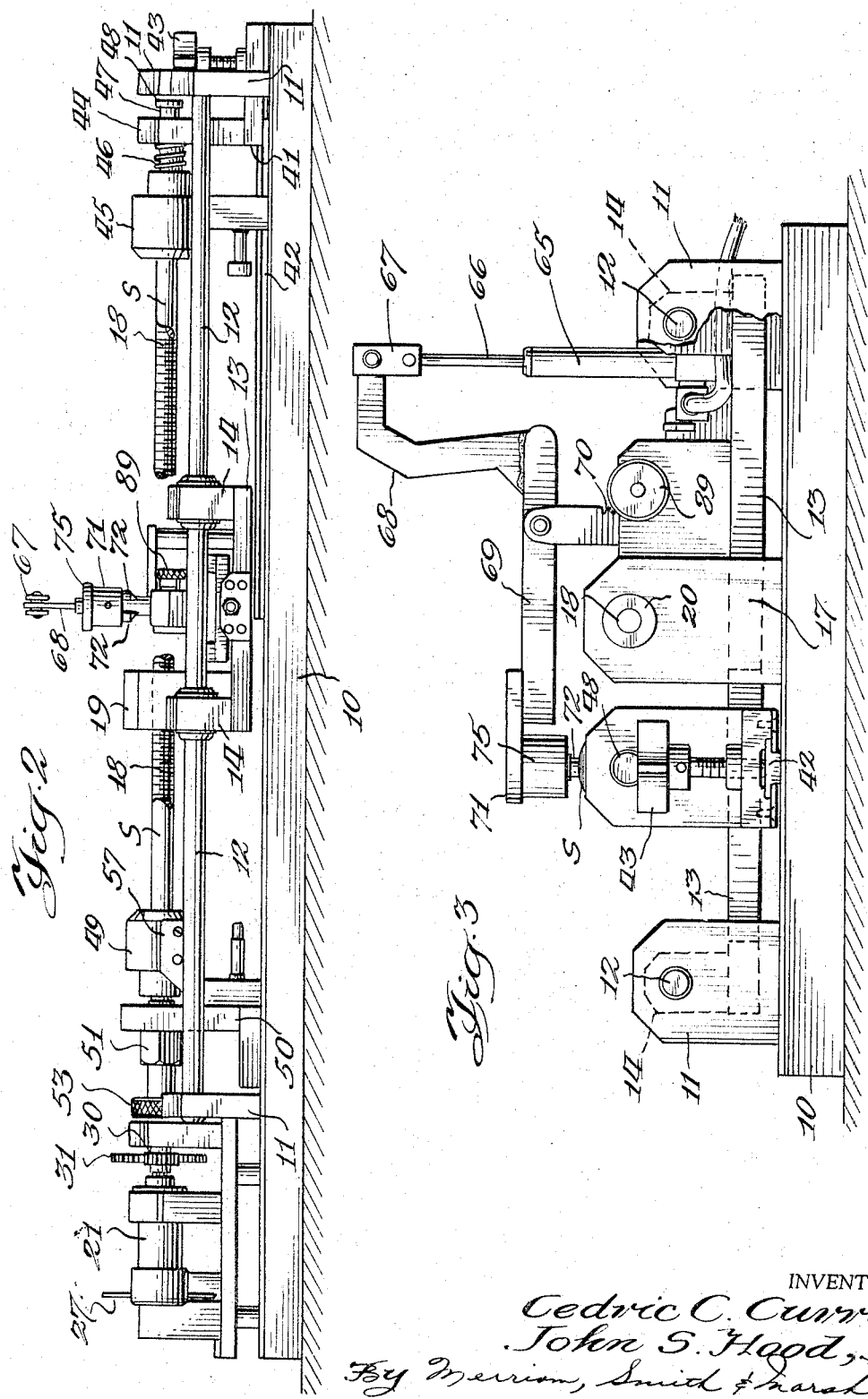

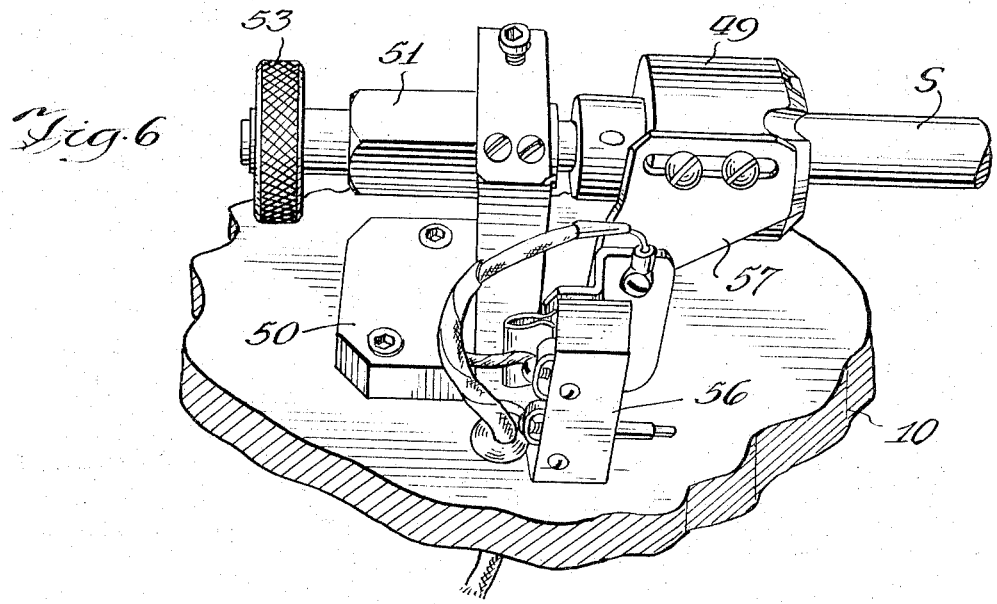
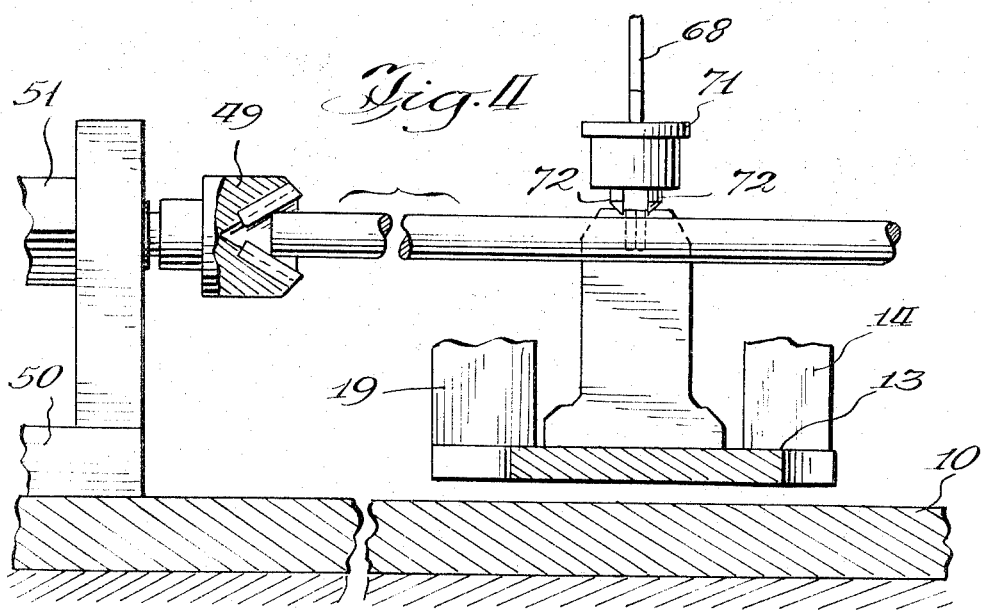
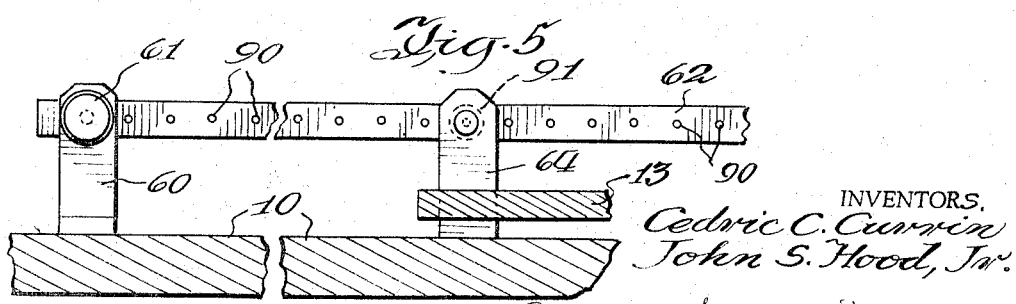

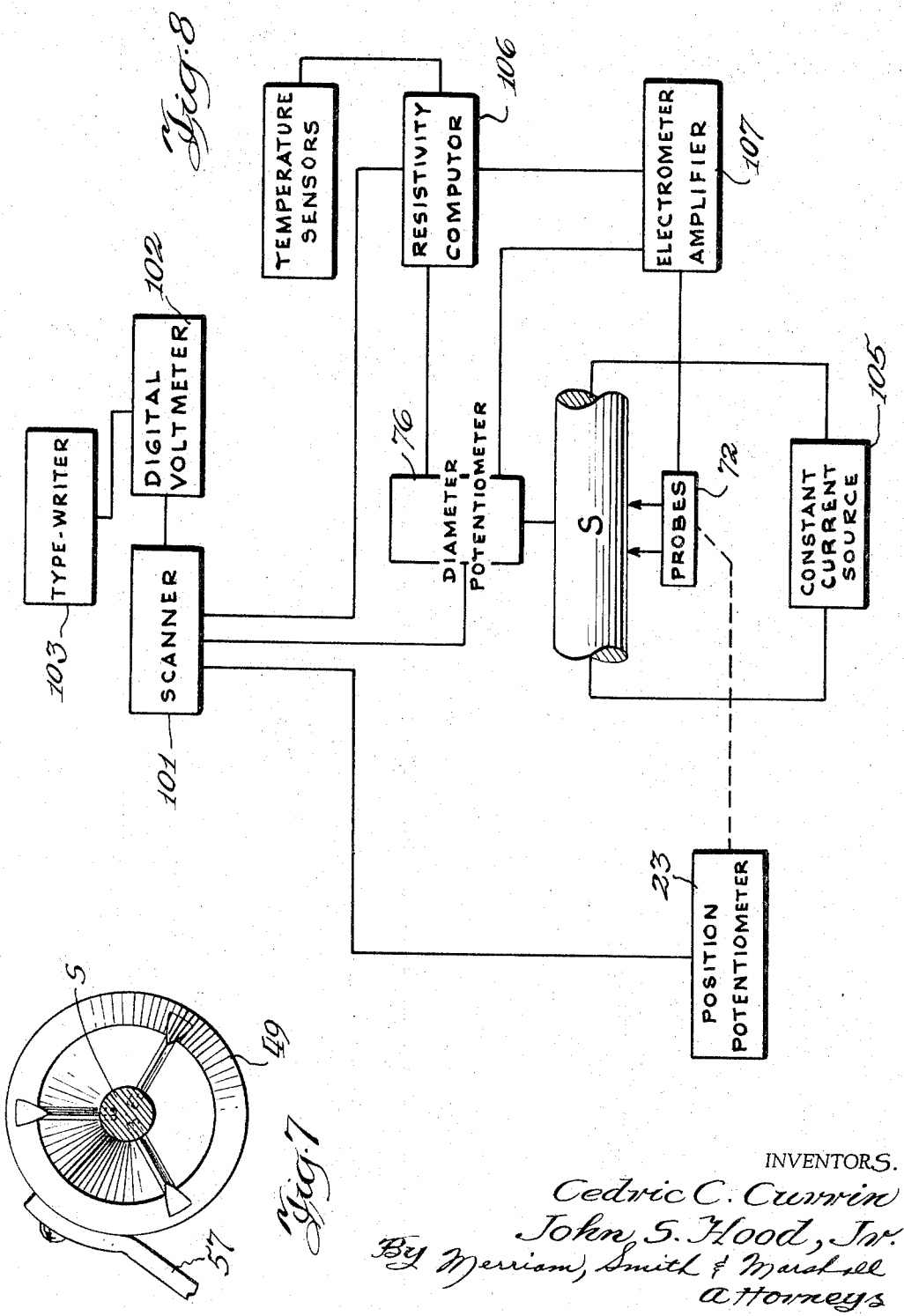

3,312,893
AUTOMATIC APPARATUS FOR MEASURING
RESISTIVITY OF SEMICONDUCTORS
Cedric G. Currin and John S. Hood, Jr., Midland, Mich.,
assignors to Dow Corning Corporation, Midland, Mich.,
a corporation of Michigan
Filed Dec. 12, 1963, Ser. No. 330,075
4 Claims. (Cl. 324—64)

This invention relates generally to an apparatus and system for measuring the resistivity of semi-conductor rods. More particularly, this invention is concerned with providing an apparatus and system for automatically measuring and recording the resistivity of monocrystalline, semi-conductor rods.

The resistivity of a semi-conductor is an extremely important materials-acceptance requirement. Because of this fact, manufacturers of semi-conductors, as part of their quality-control program, are concerned with finding some rapid and efficient apparatus for measuring this particular property. Unfortunately, however, a great deal of time is presently required to measure the resistivity of mass produced semi-conductors due in part to the fact that no automated method has been commercially available for measuring the production items. In addition, with present systems, once the desired measurements are made an excessive amount of time is required to properly record the pertinent data.

In order to obviate these deficiencies we have invented an apparatus for automatically determining the resistivity of semi-conductors produced on a mass production scale. Not only is the resistivity of the conductor automatically determined, but this property plus other relevant data are automatically recorded on quality-control cards or other storage data sheets.

In our invention, a constant electrical current is caused to pass through a semi-conductor rod, bar or strip held in a test apparatus. A movable carriage is indexed in turn to each of a plurality of desired measurement locations along the length of the specimen. At each such point, a test probe mounted on the carriage is actuated, causing spaced probes to come in contact with the specimen, whereupon the voltage drop between the probes is recorded. In addition to recording the voltage drop between the probes at each location along the length of the specimen, measurements are also made and recorded of the size of the specimen tested, e.g., diameter, at the particular location. These readings are all fed to a suitable computer which solves the equation for resistivity:

$$\rho = \frac{AVf(t)}{sI}$$

where:

$\rho$ = resistivity of the crystal specimen;
$A$ = cross sectional area of the specimen;
$I$ = current passed through the specimen;
$s$ = probe spacing;
$V$ = voltage drop between probes;
$f(t)$ = temperature dependence of resistivity.

The resistivity value as well as the diameter of the specimen and the location of the measurement point along the length of the specimen are then fed to a conventional scanner which in turn directs or feeds these data to a digital voltmeter. The output from the digital voltmeter actuates a typewriter which records the required data, e.g., resistivity, diameter and position along the length of the rod, on a quality-control card.

Other features and advantages of the invention will be apparent to those skilled in the art from the following detailed description in conjunction with the accompanying drawings, wherein:

FIGURE 2 shows a front view of our resistivity measuring apparatus;

FIGURE 3 shows a side view of our resistivity measuring apparatus;

FIGURE 4 shows a sectional view taken along line 4—4 in FIGURE 1;

FIGURE 5 shows a sectional view taken along line 5—5 in FIGURE 1;

FIGURE 6 shows an enlarged fragmentary view of one of the specimen holders, limit switches and adjusting means;

FIGURE 7 shows a sectional view taken along line 7—7 in FIGURE 1; and

FIGURE 8 shows a block diagram of the various elements included in our measuring system, indicating schematically how the various signals representing desired information are obtained and then directed by a scanner to a digital voltmeter and typewriter for recording.

Figure 1:
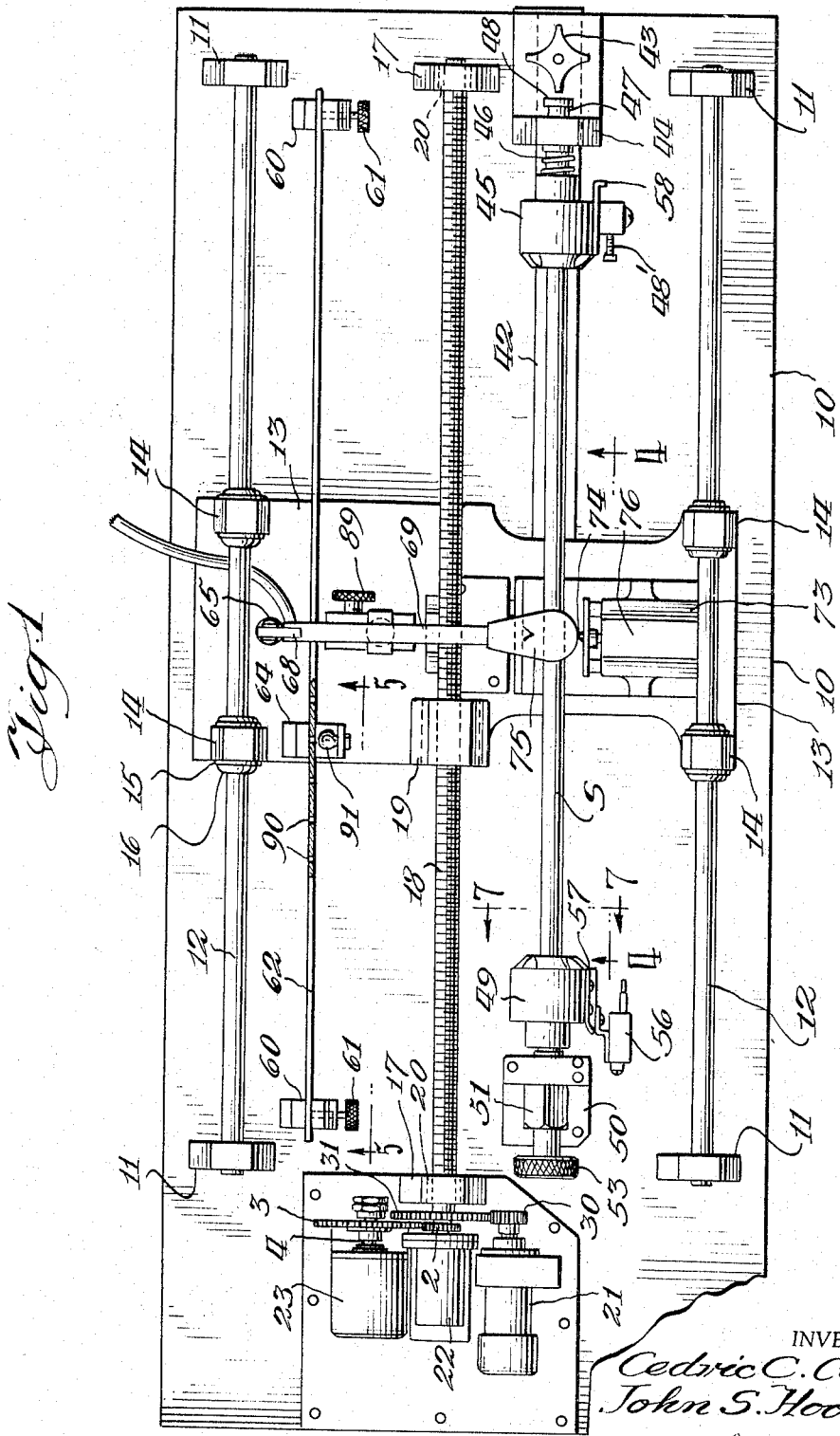
FIGURE 1 shows a plan view of our test apparatus with the rod whose resistivity is to be measured at various points along the length of the rod retained in the specimen holders.

In FIGURE 1, there is mounted on base plate 10 shaft support brackets 11, the brackets positioned at right angles to the base plate. Rigidly positioned within the brackets 11 are carriage support shafts 12, these shafts being parallel to each other and base plate 10. Carriage base 13 is supported on shafts 12 by means of carriage support brackets 14 in which are located bushings 15 and bearings 16. Between support brackets 11 screw support brackets 17 are mounted on base plate 10. Inserted within brackets 17 are bearings 20 in which is mounted carriage screw 18. Threaded on carriage screw 18 is carriage screw bracket 19, this bracket in addition being fastened to carriage base 13. Upon rotation of screw 18, bracket 19 and consequently carriage base 13 move in a desired direction along the length of screw 18.

Actuation of gear motor 21 causes spur gear 30 to rotate gear 31 which is keyed to screw 18, thus causing rotation of screw 18 and movement of carriage base 13. Also rigid with screw 18 is gear 2 which meshes with gear 3 on shaft 4 of position potentiometer 23. The output of conventional position potentiometer 23, actuated by motor 21 through gears 30, 31, 2, and 3, indicates the particular position along the length of the specimen at which a particular resistivity reading is being made.

On plate 10 there is fastened track 42 upon which specimen mounting bracket 44 is positioned in a tongue and groove arrangement, the bracket being retained in a desired position along track 42 by adjusting screw 43. Specimen holder 45 is spring mounted on bracket 44 by means of spring 46 or other resilient means located along shaft 47. Shaft 47 having head 48 located on one end thereof is inserted into position through mounting bracket 44 and fastened by suitable means to holder 45. Spring 46 is compressed between bracket 44 and specimen holder 45.

In axial alignment with specimen holder 45 is a second specimen holder 49. Bracket 50, fixed to base plate 10, carries internally threaded nut 51 which receives adjusting screw 53 at one end of which specimen holder 49 is rigidly attached. Both holders 45 and 49 shown in the drawings and particularly FIGURE 7 are frusto-conical shaped for the receipt of specimens of various sizes and diameters. Naturally, other specimen holders could be readily adapted for use if samples of different shape and proportions are to be measured for resistivity.

Fastened by screw means on holders 45 and 49, respectively, are slotted brackets 57 and 58, as shown in FIGURE 6. Attached to these brackets are adjustable limit switches 48 and 56, the purpose of the swtiches being to control the extent of movement of cariage 13 as it travels along screen 18.

Pneumatic cylinder 65 (FIGURE 3) having piston rod 66 attached thereto is located on carriage 13. At the upper end of piston rod 66 there is fastened pin connector 67. One end of link 68 is pinned to connector 67 while the remaining end is rigidly attached to one end of rocker arm 69. Rocker arm 69 is pinned on an adjustable fulcrum 70 which can be raised or lowered, depending on the specimen being measured, by a rack and pinion operated by screw 89. On the remaining end of arm 68 is test probe arm 71 having probes 72. Upon actuation of cylinder 65, rod 66 is forced upwardly, causing arm 69 to pivot on fulcrum 70 and test probe arm 71 to move downwardly so that probes 72 are forced into contact with the specimen S whose resistivity is being measured.

In order to position the specimen at the desired test points and to actuate the test probe, photo cell 64 is used in conjunction with lamp 91 (FIGURES 1 and 5). Brackets 60, attached to base plate 10, hold apertured strip 62 adjustably retained therein by screws 61. Apertures 90 in strip 62 are spaced at desired locations along the length of the strip so that when carriage 13 is traveling along the length of screw 18, beams from lamp 91, located on carriage 13, will pass through an aperture 90 and energize photocell 64. Energization of photo cell 64 stops motor 21 for the necessary time to take the desired measurements and also actuates cylinder 65 and consequently test probe arm 71, whereby the voltage drop across probes 72 can then be ascertained. Though the circuit between cell 64, cylinder 65, and motor 21, etc. have not been shown, it is appreciated that any desired circuit could be utilized by one skilled in the art to achieve the desired actuation of the various components of our apparatus.

Also located on carriage 13 is pneumatic cylinder 73 (FIGURE 1) having probe 74 attached thereto. A corresponding probe 75 is aligned with and spaced from probe 74. The specimen whose resistivity is to be measured is located between the space formed by probes 74, 75. Upon actuation of cylinder 73, probes 74, 75 contact the specimen and a dual element potentiometer 76 positioned on carriage 13 supplies an output voltage representative of the diameter or size of the specimen at that point on the specimen. Actuation of cylinder 73 can be readily initiated by suitable means in the overall circuit employed for the timed sequence of operations.

OPERATION

In the operation of our apparatus, crystal specimen S whose resistivity is to be measured at various points along its length is inserted in holders 45 and 49 and adjusted into final positions by means of adjusting screws 43 and 53.

Gear motor 21 is actuated, causing rotation of worm screw 18 which in turn initiates movement of carriage 13 along the length of screw 18. After carriage 13 has moved a specified distance, a beam of light is emitted through an aperture 90 in strip 62 causing energization of cell 64, which in turn deenergizes motor 21, thus momentarily stopping movement of screw 18. Potentiometer 23 provides an output voltage corresponding to the portion of the total length of specimen S which the carriage has traversed.

At the same time, pneumatic cylinder 65 is energized to actuate test probe arm 71 as previously described. After the measurements at the particular point have been made, motor 21 is reenergized by any suitable means, e.g., a switch actuated by rod 66, indexing carriage 13 to another location along the length of screw 18 until a light beam is emitted through the next aperture in strip 62, whereupon the necessary measurements for ascertaining resistivity are recorded at this point. This procedure is repeated until the resistivity of specimen S has been measured at desired points along the entire length of the specimen.

In addition to the resistivity and position measurements, there is also recorded the specimen diameter measurements as heretofore described by probes 74, 75, connected to a dual element potentiometer 76.

In FIGURE 8, there is shown a block diagram of the various measurements and the use of these measurements to obtain the desired data.

Scanner 101 is a switch which selects, in the proper order, the various signals corresponding to the desired measurements of the crystal specimen S and feeds these signals to a digital voltmeter 102 which gives a visual indication of the measurement and also sends a signal to a typewriter 103 which prints the information on a data sheet or card used to characterize the particular crystal specimen.

Typically, the first recording made at any position on crystal specimen S is the distance of the measuring probe measured from one end of specimen S. This is obtained from the position potentiometer 23 mechanically linked to the drive mechanism of the carriage. The output of this potentiometer is a voltage which corresponds to the position along the axial length of specimen S.

The second measurement is the diameter or size of specimen S at the particular location. For this reading, a standard voltage is supplied to the first element of dual element potentiometer 76. The output signal of the potentiometer, representing the diameter of specimen S, is fed to the scanner 101 and digital voltmeter-typewriter combination for recording.

The third measurement obtained is the resistivity of the crystal. This information is obtained from the solution, by means of a suitable analog computer 106, of the equation (assuming a cylindrical rod is to be measured):

$$\rho = \frac{\pi V d^2}{4sI} f(t)$$

where:

$\rho$ = resistivity of the crystal specimen;
$d$ = diameter of the specimen;
$I$ = current passed through the specimen;
$s$ = probe spacing;
$V$ = voltage drop between probes;
$f(t)$ = temperature dependence of resistivity.

A constant current I is supplied from a suitable source 105 and is passed through crystal specimen S, the current leads being suitably attached to the ends of specimen S at the location of holders 45, 49. (This arrangement is used with the two-probe method of resistivity measurement. In the four-probe method, this current is produced between two of the probes.) The spacing between probes 72 is held constant so that this term in the above formula is always constant. The voltage drop between the probes is supplied to an electrometer amplifier 107 where it is amplified to a desired level. The output of the amplifier is then applied to the first element of the dual element potentiometer 76, in place of the standard voltage used in measuring the diameter of the specimen, the output of the potentiometer then representing the product of voltage (V) and diameter (d). This signal is fed to the second element of the dual element potentiometer to give an output voltage proportional to $Vd^2$. The computer 106 also contains the necessary components to provide the scale factor $\pi/4$ as well as silicon temperature-sensitive resistors which act as temperature sensors to correct the resistivity reading to a desired temperature.

After the necessary readings have been taken at a particular position along the length of crystal specimen S, the scanner or some other suitable means provides a signal which causes carriage 13 to index to the next desired point of measurement on specimen S, this procedure being repeated until position, resistivity and diameter readings have been obtained along the entire axial length of crystal specimen S.

Although pneumatic cylinders have been shown for operation of piston rod 66 and probes 74 and 75, it will be apparent that other means, e.g., hydraulic or solenoid actuated devices, would also be used.

Similarly, although a screw arrangement has been shown as part of the drive means for driving the carriage, other means, e.g., hydraulic, pneumatic, or electrical, could be used in place of the screw. Further, the carriage could be mounted on wheels movable in a track as opposed to the shaft supporting arrangement shown in the drawings, or the specimen could be mounted in a movable carriage and caused to move past stationary probes.

In FIGURE 8, a scanner, amplifier, digital voltmeter, typewriter and computer have been indicated. None of these items per se is inventive as applied to this application, suitable forms of each of these items being commercially available or obvious to those skilled in the art. Rather it is the combination of these components used in conjunction with our device that form the inventive discovery.

Moreover, although two probes have been shown in test probe 71, it is well within the purview of one skilled in the art to modify the apparatus of the invention for use in the four-probe method of resistivity measurement, in which two of the probes are used to create a current flow therebetween, and no diameter measurement is required (see Valdes, Proc. I.R.E., 42, 420, 1954). Further, although the circuits for measuring the resistivity, etc., and for actuating cylinders 65 and 73 are not shown, it is obvious that numerous circuits and systems could be devised to accomplish the desired results by one skilled in the art.

The foregoing detailed description has been given for clearness of understanding only and no unnecessary limitations should be understood therefrom, as modifications will be obvious to those skilled in the art.

What is claimed is:

1. Apparatus for measuring resistivity data of a semiconductor specimen, said apparatus comprising:
   a base,
   specimen holding means supported by said base,
   a carriage mounted for relative movement with respect to said specimen holding means,
   drive means for effecting said relative movement between said specimen holding means and said carriage,
   location measuring means located on said base plate for measuring the location of said carriage with respect to said specimen,
   at least one pair of probes located on said carriage adapted for contact with said specimen,
   means for passing a constant electrical current through at least a portion of said specimen,
   means for measuring the voltage drop between said probes when said probes are in contact with said specimen,
   a first contact element located on said carriage contacting said specimen at a desired point,
   a second contact element spaced from said first contact element connected to said carriage for selectively contacting said specimen at a different desired point,
   actuating means for moving said second contact element into contact with said specimen, and
   potentiometer means electrically connected to said first and second contact elements for producing an output signal representative of the size of said specimen.

2. Apparatus for measuring resistivity data of a semiconductor specimen as defined in claim 1 and further including:
   a resistivity computer electrically connected to said probes and said potentiometer means for producing an electrical signal representative of the resistivity of said specimen.

3. Apparatus for measuring resistivity data of a semiconductor specimen as defined in claim 2 and further including:
   temperature sensing means connected to said computer for correction to a desired temperature of the electrical signal produced by said computer.

4. Apparatus for measuring resistivity data of a semiconductor specimen as defined in claim 3 and further including:
   a scanner electrically connected to said location measuring means, said potentiometer means, and said computer for receipt of electrical signals representative of position and the size and resistivity of said specimen, and
   a combination digital voltmeter-typewriter for recording values received from said scanner.

References Cited by the Examiner

UNITED STATES PATENTS

| | | | |
|---|---|---|---|
| Re. 21,853 | 7/1941 | Atkinson | 324—64 |
| 2,133,725 | 10/1938 | Sperry et al. | 324—64 |
| 2,628,680 | 2/1953 | Seybold. | |
| 2,798,199 | 7/1957 | Potter | 324—62 |
| 3,225,296 | 12/1965 | Roth | 324—61 |
| 3,247,454 | 4/1966 | Gale et al. | 324—54 |

WALTER L. CARLSON, *Primary Examiner.*

E. E. KUBASIEWICZ, *Assistant Examiner.*